(12) United States Patent
Hunter

(10) Patent No.: US 8,574,705 B2
(45) Date of Patent: Nov. 5, 2013

(54) LAMINATES AND METHOD OF MANUFACTURING LAMINATES WITH LAYERS OF NON-UNIFORM THICKNESS

(75) Inventor: Edward Garnet Hunter, Toronto (CA)

(73) Assignee: Roarockit Skateboard Company, Toronto, Ontario ( * ) Notice: Subject to any disclaimer, the term of this patent is extended or adjusted under 35 U.S.C. 154(b) by 746 days.

(21) Appl. No.: 12/401,860

(22) Filed: Mar. 11, 2009

(65) Prior Publication Data

US 2010/0233435 A1    Sep. 16, 2010

(30) Foreign Application Priority Data

Feb. 27, 2009   (CA) ...................................... 2656602

(51) Int. Cl.
*B32B 3/00* (2006.01)
*B62M 1/00* (2010.01)
*A47C 7/02* (2006.01)

(52) U.S. Cl.
USPC ...... 428/172; 428/161; 428/162; 297/452.21; 297/452.29; 280/87.042

(58) Field of Classification Search
USPC .............. 428/106, 156, 172, 533, 535, 537.1; 297/252.21–252.33, 252.7, 297/452.21–452.33; 280/87.042
See application file for complete search history.

(56) References Cited

U.S. PATENT DOCUMENTS

| | | | |
|---|---|---|---|
| 1,794,194 A * | 2/1931 | Meyercord et al. ........... | 428/162 |
| 2,105,381 A | 1/1938 | Steiner | |
| 2,365,334 A | 12/1944 | De Vries | |
| 2,390,684 A | 12/1945 | Bendix | |
| 2,395,468 A | 2/1946 | Eames | |
| 2,708,296 A * | 5/1955 | Soehner ........................ | 428/106 |
| 3,418,195 A | 12/1968 | Allan | |
| 3,480,501 A | 11/1969 | Burch | |
| 3,524,793 A * | 8/1970 | Carley ........................... | 428/161 |
| 3,801,116 A * | 4/1974 | Benner ........................ | 280/610 |
| 4,084,996 A * | 4/1978 | Wheeler ....................... | 156/257 |
| 4,178,012 A | 12/1979 | Roth et al. | |
| 4,343,485 A * | 8/1982 | Johnston et al. .............. | 280/609 |
| 4,507,162 A | 3/1985 | Iwamoto | |
| 4,731,038 A | 3/1988 | Hancock et al. | |
| 4,930,556 A | 6/1990 | Prihoda | |
| 5,071,688 A | 12/1991 | Hoffman | |
| 5,098,762 A | 3/1992 | Nakajima | |
| 5,513,865 A * | 5/1996 | Brooks et al. ............ | 280/87.042 |
| 6,182,986 B1 * | 2/2001 | Smith ...................... | 280/87.042 |
| 6,319,585 B1 | 11/2001 | Coronado | |
| 6,460,868 B2 * | 10/2002 | Madrid .................... | 280/87.042 |
| 6,527,284 B2 * | 3/2003 | Bert ......................... | 280/87.041 |
| 6,854,748 B2 * | 2/2005 | Wimbish et al. ......... | 280/87.042 |
| 2003/0196744 A1 | 10/2003 | Sicola | |
| 2008/0129004 A1 | 6/2008 | Magee | |

OTHER PUBLICATIONS http://www.almostawebsite.com/almost-uber-light/uberlight-concept/, Aug. 2009.

\* cited by examiner

*Primary Examiner* — Donald J Loney
(74) *Attorney, Agent, or Firm* — Jenna L. Wilson; Dimock Stratton LLP

(57) ABSTRACT

A laminate comprising at least one substantially continuous layer of non-uniform thickness and a method of manufacturing the same is provided. In one embodiment, a veneer sheet is placed on top of a one-sided sanding mold having a contoured upper surface and passed through a thickness sander until the desired thickness of the pattern on the veneer is achieved. Each veneer layer of the laminate may be shaped in this manner. A plurality of contoured veneers are then laminated using methods known in the art, the result of which is a strong laminate that is composed of substantially continuous veneers of non-uniform thickness.

17 Claims, 10 Drawing Sheets

LAMINATES AND METHOD OF MANUFACTURING LAMINATES WITH LAYERS OF NON-UNIFORM THICKNESS

BACKGROUND

1. Technical Field

The present invention relates generally to the field of laminates, and more specifically to laminates of a plurality of contoured layers of non-uniform thickness and a method of manufacturing the same.

2. Description of the Related Art

Conventionally, multi-layered veneer laminates of non-uniform thickness have been made either by pressing flat, uniformly thick, sheets of veneer and glue together on a mold, then milling the already formed laminated material to give it the desired thickness pattern, or by cutting out or otherwise removing pieces of the veneer sheets from what is to be the thinner area before the layers are pressed together on a three-dimensional mold. The existing methods of varying the thickness of veneer laminates weaken the material as some of the veneer layers are discontinuous.

For applications of veneer laminates such as furniture and skateboard decks, it is desirable to use a laminate that is lightweight, strong and aesthetically pleasing. The thickness of a laminated material, such as a skateboard deck, may be varied for functional purposes, for example to provide strength, to achieve flexibility in certain parts of the deck, to provide an adequate grip on the deck surface or to provide an aid to foot placement, or for aesthetic purposes. However, by using traditional methods to create a contoured, multi-layered veneer laminate deck of non-uniform thickness, the board is weakened by compromising the continuity of the veneer layers.

BRIEF DESCRIPTION OF THE DRAWINGS

In drawings which illustrate by way of example only a preferred embodiment of the invention.

FIG. 6B is a plan view of the chair back of FIG. 6A.

FIGS. 6C and 6D are cross-sectional views of the chair back of FIG. 6B.

DETAILED DESCRIPTION OF THE INVENTION

Figure 1:
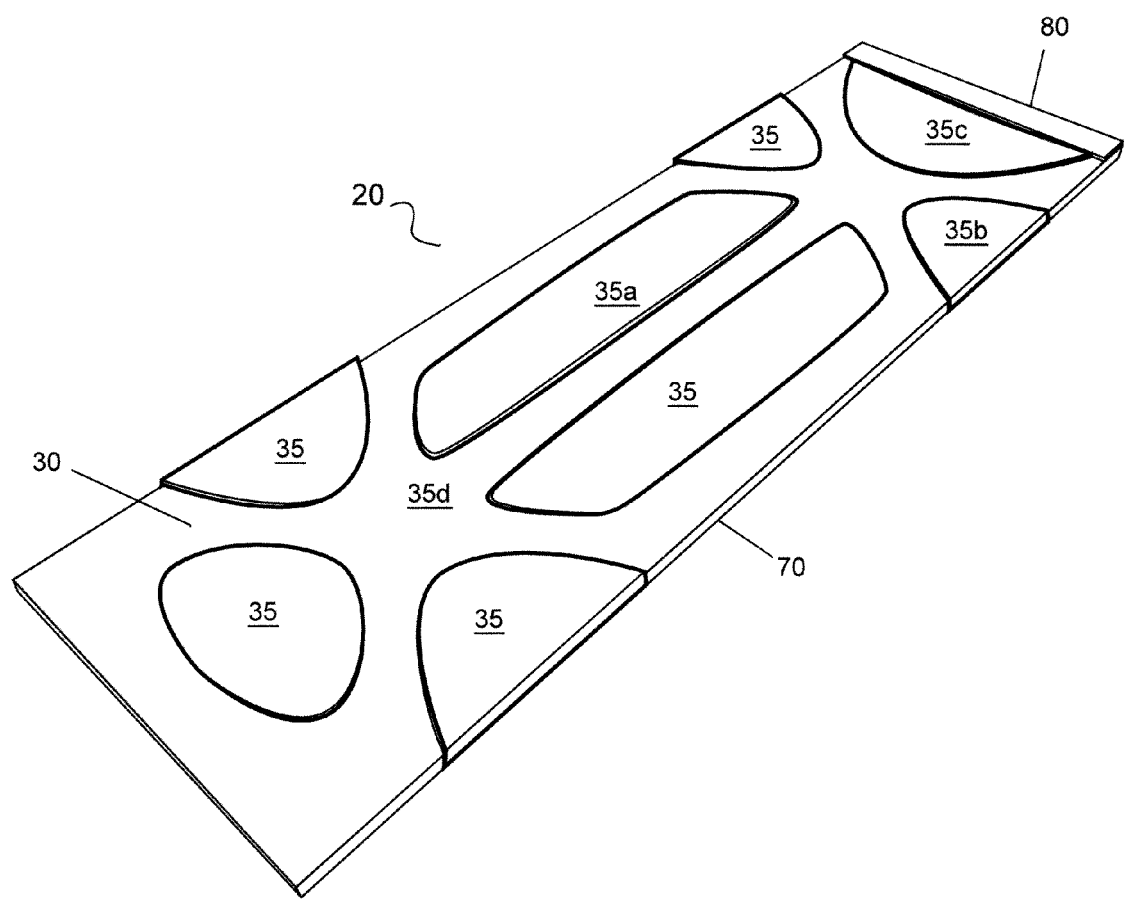
FIG. 1 is a perspective view of an embodiment of the sanding mold.

Strength and decorative features are desirable in furniture, finishing and building material applications of laminates. For example, a contoured stool seat, or any other product manufactured from a laminate material, benefits from a strong building material, but it is often desirable that it also be aesthetically pleasing. There is therefore provided a laminate comprising at least one substantially continuous layer extending over an entire area of the laminate, the at least one substantially continuous layer comprising at least one interior area of non-uniform thickness and further comprising a first face and an opposing face, wherein each of the first face and the opposing face are in substantially continuous contact with a surface of an adjacent layer of the laminate.

In a further aspect, there is provided a laminate material comprising a plurality of substantially continuous veneer layers each comprising at least one interior area of non-uniform thickness, each of said plurality of substantially continuous veneer layers comprising a first face and an opposing face, such that the first face of a first one of the plurality of substantially continuous veneer layers is in substantially continuous contact with an opposing face of an adjacent one of the plurality of substantially continuous veneer layers.

There is also provided a method of manufacturing a laminated material, comprising contouring a first face of a first layer, to provide a layer comprising at least one interior area of non-uniform thickness such that the first face is substantially continuous and an opposing face is substantially continuous; and applying said layer of non-uniform thickness as a laminate to an entire surface of a first subject material such that at least one of the first face and the opposing face is in substantially continuous contact with the entire surface of the subject material.

There is also provided a method of manufacturing a laminate layer, comprising placing a layer comprising a first face and an opposing face on a contoured surface, such that the opposing face faces the contoured surface; and applying pressure and sanding the first face to provide a layer comprising at least one interior area of non-uniform thickness, wherein each of the first face and the opposing face is substantially continuous.

In a further aspect, the contoured surface may be provided by defining a three-dimensional contour, and applying the three-dimensional contour to a substrate. In still a further aspect, the layers are formed of wood veneer. The laminate thus provided may be shaped into a utilitarian or decorative object, such as a skateboard deck or furniture item; the various layers of original material, such as veneer, may be cut to the approximate shape of the finished object prior to contouring each layer to provide layers of non-uniform thickness and lamination.

Thus, an advantage over prior art methods of providing contoured laminates is provided. Not only does the substantial continuity of the layers in the laminate improve the strength of the laminate product, but it will be appreciated by those skilled in the art that the non-uniform thicknesses of the layers within the laminate may provide an aesthetically interesting side profile comprising striations, which may be enhanced through the use of different types of laminate layers, for example different types of wood veneer. Frequently the design of fine furniture mandates an aesthetically pleasing appearance on all surfaces; where furniture is manufactured from a laminate, a pleasing design may be derived from the cross-sectional surface of the laminate. The non-uniform thickness of layers in the laminate described herein not only provides a design interest that may increase the aesthetically pleasing effect of the cross-sectional surface, but the use of the non-uniform thickness of laminate layers may reduce the number of laminate layers required to provide the aesthetically pleasing effect; thus, in some circumstances, the cost to manufacture the laminate may be reduced, if fewer layers are required. At the same time, as will be appreciated by those skilled in the art, the surface area of each non-uniformly thick layer within the laminate is increased due to the variation in thickness, thus increasing the surface area over which the laminate adhesive is distributed during a lamination step, increasing the strength of the laminate. In other aesthetically pleasing designs, an increased number of layers may be provided within the laminate.

Furthermore, the embodiments disclosed herein provide an advantage over prior art laminates for use in furniture and other items, where variation in thickness is desired. In the prior art, for example, if it was specified that the finished laminate piece should have variations in overall thickness (for example, an armrest may be specified to have a maximum thickness of 2 inches at one end, tapering to 1 inch at the distal end), a prior art solution would involve providing a laminate composed of layers of uniform thickness, and sanding or cutting the laminate to the desired dimensions, resulting in waste. An alternate prior art solution would involve inserting or sandwiching, during the lamination process, wedges or stacks of veneer material to provide the added thickness at one end or in the area where additional thickness is desired. These wedges, however, do not add to the strength of the finished laminate at the thinner end since these layers do not extend over the full surface area of the finished laminate. The embodiments described herein, however, provide for variations in thickness in the finished laminate while also enhancing the strength of the laminate, because each individual layer in the laminate can extend over the entire surface area of the finished laminate. Also in the prior art, where a finished workpiece was required to have a contoured surface finished with veneer, a solid shaped or molded core had to be provided, manufactured from another material such as fiberboard or another moldable substance, which would form the substrate for the veneer and would also form part of the finished workpiece. An embodiment described herein does not require that such a shaped or molded core be embedded within the workpiece, because contoured layers of veneer may be used to shape the contoured surface.

In the foregoing and following description, for convenience "laminate" may refer to a finished laminate product or material, comprising two or more layers of material. Also for convenience, the embodiments are described with reference to veneer. It will be appreciated by those of ordinary skill in the art that the layers forming the laminate may comprise not only wood veneer, such as hardwood veneer, but also engineered or synthetic products, provided they are capable of being contoured and laminated. Thus, it is to be understood in the following description that "veneer" may include other materials, whether natural, synthetic, or engineered, the selection of which is within the scope of those skilled in the art.

Figure 2:
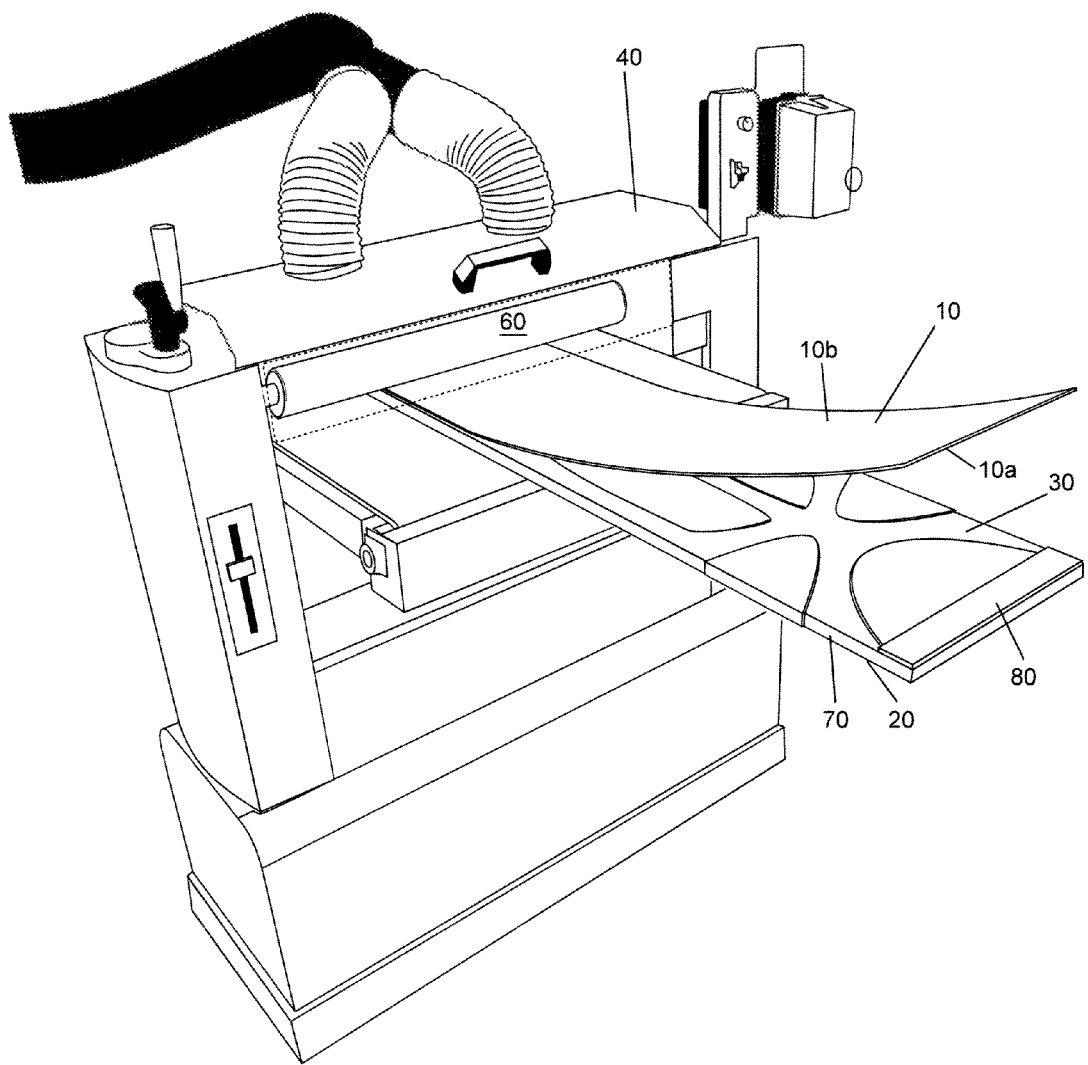
FIG. 2 is a perspective view of a veneer over a sanding mold passing through a thickness sander.

Referring first to FIG. 2, in one embodiment a flat sheet of veneer 10 is contoured by placing it on a one-sided sanding mold 20 having a contoured surface 30. such that one face of the veneer 10b faces away from the contoured surface 30, while an opposing face of the veneer 10a faces the mold 20. The veneer 10 is then shaped, for example by sanding, while pressure is applied to the area of the veneer face 10b being sanded, such that the corresponding portion of the opposing face 10a of the veneer contacts the contoured surface 30 of the mold 20. This may be accomplished, for example, by passing the veneer 10 and mold 20 under a thickness or drum sander 40 until the desired thickness of the pattern on the veneer is achieved. One or more layers of the laminate may be shaped in this manner, then laminated together using methods that will be known to those skilled in the art. An epoxy adhesive may be used, rather than a water-based adhesive, to minimize swelling of the wood grain if a veneer is selected for the layers, and thus minimize distortion of the contours of the various veneer layers. A laminate comprising one or more substantially continuous layers of non-uniform thickness is thus produced. The laminate may have non-uniform thickness or uniform thickness, depending on the shape of the veneers.

Turning to FIG. 1, an example of the sanding mold 20 for use in sanding the veneer 10 (not shown in FIG. 1) is shown. The sanding mold 20 comprises a base or substrate 70, formed in a sufficiently dense and rigid material, such as particle board, plywood, solid wood, hard plastic or aluminum, such that it does not deform or break during the sanding of the veneer sheet 10. The mold 20 is provided with a contoured surface 30, and in the embodiment shown in the drawings, with a raised edge 80. The base 70 is of an appropriate size and thickness such that it and the veneer 10 may be accommodated by the thickness sander 40, shown in FIG. 2. The raised edge 80 provides a stop to prevent the veneer 10 from sliding out of the desired position during sanding. The contoured surface 30 is carved, milled, taped or otherwise contoured with the negative relief pattern of the desired veneer.

Figure 3:
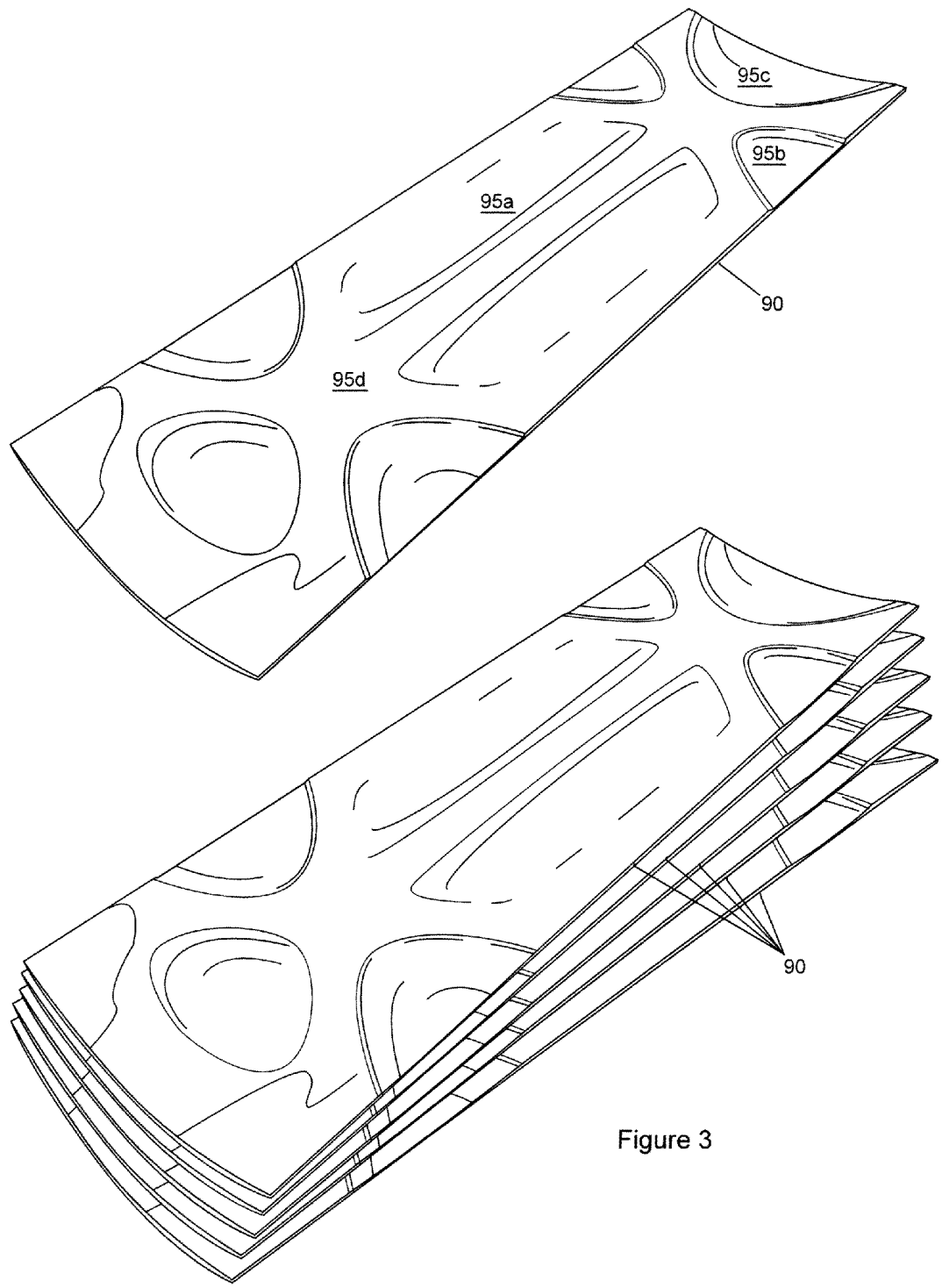
FIG. 3 is a perspective view of contoured layers.

In one embodiment, the contours of the sanding mold 20 are formed by adhering one or more layers of material 35 in the desired pattern to the base 70. As the contours of the mold 20 represent a negative relief pattern of the contoured veneer, once finished, the contours of the mold 20 will be higher where the contoured veneer is to be made thinner. In one low-cost embodiment, masking tape or similarly thin adhesive strips may be applied to areas 35 of the upper surface 30 of a particleboard 70 to form a pattern or artistic design. The depth of the relief pattern is adjusted by varying the size and number of layers of tape applied to the upper surface 30. With reference to FIG. 3, areas of the mold 20 raised with tape 35a, 35b, 35c will correspond to thinner areas 95a, 95b, 95c on the contoured veneer 90, and areas with no tape 35d correspond to the thickest areas 95d on the contoured veneer 90. The height of the contours on the mold 20 will not exceed the thickness of the veneer 10 to be used with the mold, so as to avoid sanding through the entire thickness of the veneer. Preferably, the contours of the mold 20 avoid large discontinuities, such as high, sharp corners or edges, which may result in breaking of the veneer 10 when it is sanded, or otherwise create discontinuities in the contoured veneer 90. Depending on the selection of the type of veneer 10 or other laminate layer to be placed on the mold, however, the mold 20 may be provided with sharply angled contours, provided the veneer 10 may be pressed in place over these sharply angled contours without breaking.

As can be seen in FIG. 3, the contoured veneer 90 is substantially continuous on both faces of the veneer, in that there are no appreciable discontinuities (such as "stair steps", sharply-angled protuberances, notches, or holes); instead, the surfaces of the veneer 90 extend substantially continuously such that substantially every point on the contoured veneer 90 surfaces is capable of being laminated to an adjacent layer, as discussed below. The contoured veneer 90 thus has at least one interior area, such as 95a, 95b, or 95c, that has a substantially non-uniform thickness. In some embodiments, the contoured veneer 90 may include alignment holes, or holes resulting from the grip of upstanding spikes or pins used to retain the veneer 10 on the contoured mold 20, as described below.

Referring back to FIG. 2, the veneer sheet 10 may be contoured by placing it on the contoured surface 30 of the sanding mold 20. The two pieces together may then be passed under a thickness or drum sander 40, with the veneer sheet 10 between the sanding mold 20 and the sanding drum or surface 60, until the desired thickness of the veneer 10 is attained. one type of thickness sander 40 that may be used has a motor driven belt that moves the material to be sanded under a spinning drum 60 wrapped in an abrasive material, such as the Dual Drum Sander by General International Manufacturing Co. Ltd., Montreal, Quebec, H1P 1Y3.

As noted above, in one embodiment the mold 20 is provided with a raised edge 80 or a stop to retain the veneer 10 in place on the mold 20 when the veneer-mold assembly is fed into the thickness sander.

In another embodiment, the veneer 10 is temporarily affixed to the mold 20 using an adhesive spray or contact cement. To minimize adhesive build-up on the mold 20, the adhesive or contact cement may be applied only to designated areas of the mold 20. Alternatively, one or more areas on the final contoured surface of the mold 20 may comprise non-skid tape, sandpaper, or another surface providing frictional resistance to displacement of the veneer 10 when the veneer-mold assembly is fed into the thickness sander.

In yet a further embodiment, the mold 20 may be provided with one or more upstanding spikes or pins (not shown in the figures) in one or several areas of the mold 20, such that when the veneer 10 is laid over top of the spikes or pins and pressed onto the mold 20, the spikes or pins bite into the veneer 10 and thus hold the veneer 10 in place on the mold 20 so that it can be fed into the thickness sander. The spikes or pins thus preferably are no taller than the thickness of the veneer 10, and preferably no taller than the anticipated thickness of the contoured veneer 90 once the veneer 10-mold 20 assembly is passed through the thickness sander or once the veneer 10 is otherwise milled or contoured to the desired thickness pattern.

In a further embodiment, alignment pins may be provided on the mold 20; the veneer 10 is then provided with alignment recesses or alignment holes (not shown) for receiving the alignment pins. Again, preferably the alignment pins are no taller than the anticipated thickness of the contoured veneer 90 once the veneer 10-mold 20 assembly is passed through the thickness sander or once the veneer 10 is otherwise milled or contoured to the desired thickness pattern.

The sanding mold 20 may alternatively be provided with perforations through its entire thickness and over its entire surface area, and placed on a vacuum table, or alternatively the sanding mold 20 may form the surface of the vacuum table; the veneer sheet 10 may then be held to the contoured surface 30 of the mold 20 by a vacuum, and the sander may be passed over the veneer sheet 10 to create the contoured veneer 90.

The stop or wall 80 described above may be used separately, or in conjunction with one or more of the alternative embodiments described above. Each of the alternative embodiments described above may be used individually, or in combination with one or more of the other embodiments.

As shown in FIG. 3, after passing under the thickness sander, the contoured veneer 90 takes on a non-uniform thickness with a thickness pattern that is an approximate inverse of the contours of the sanding mold 20. It will be appreciated that in view of the thickness and flexibility of the original veneer 10, the contours of the contoured veneer 90 will not be an exact, inverse match to the contours of the sanding mold 20; for example, the slopes of the contoured veneer 90 may be gentler than the slopes of the contours of the mold 20, particularly where the mold 20 contours are steep or sharp. This sanding procedure is repeated for each veneer to be used in the laminate that is to have the non-uniform thickness profile provided by the mold 20.

Alternatively, the thickness pattern of the veneer may be created by other means. For example, in another embodiment, the veneer 10 may be milled without the use of a contoured mold 20, instead using a CNC Machine (Computer Numerical Control Machine) to produce the contoured veneer 90. The milling machine, in this embodiment, would be programmed to mill the veneer 10 to the appropriate thicknesses over the surface of the veneer 10. In other embodiments, the contoured veneer 90 may be formed by hand carving, sandblasting, or computer-controlled laser cutting.

The veneers are then laminated using known methods and materials, using molds and clamping methods that are generally known to those skilled in the art. One example of a lamination technique making use of only simple equipment is taught in U.S. Pat. No. 7,132,030, issued on Nov. 7, 2006 to Hunter, which is incorporated herein by reference. Adhesive may be applied to the layers for forming the laminate, including at least one contoured layer 90, and stacked on a one-sided mold. The mold for making the laminate may be contoured itself, such as that described in Hunter, so that the laminate formed using the one-sided mold is itself contoured by the lamination process, in addition to having contours due to the use of one or more contoured layers 90. The stacked layers may be held in place using alignment pins, elastic bands, or stretchable netting, then inserted into a vacuum bag. Air is evacuated from the vacuum bag, for example using a hand vacuum pump, causing the layers of the laminate to conform to the shape of the one-sided mold. The adhesive is allowed to dry and cure, providing a molded laminate piece 100.

Figure 4A:
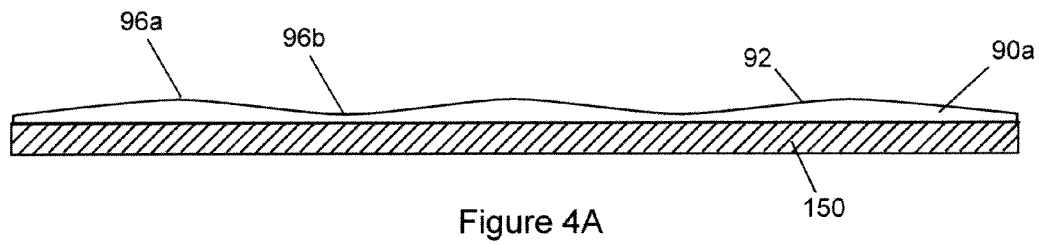
FIGS. 4A, 4B, and 4C are cross-sectional views of exemplary contoured veneers undergoing lamination.
Figure 4B:
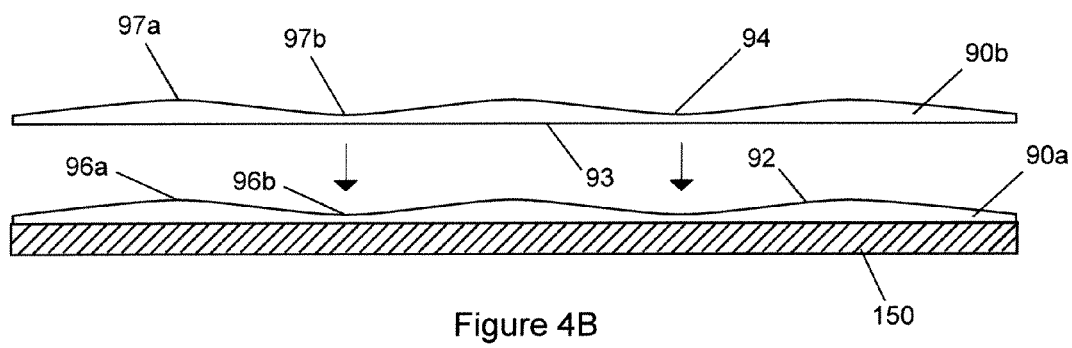
Figure 4C:
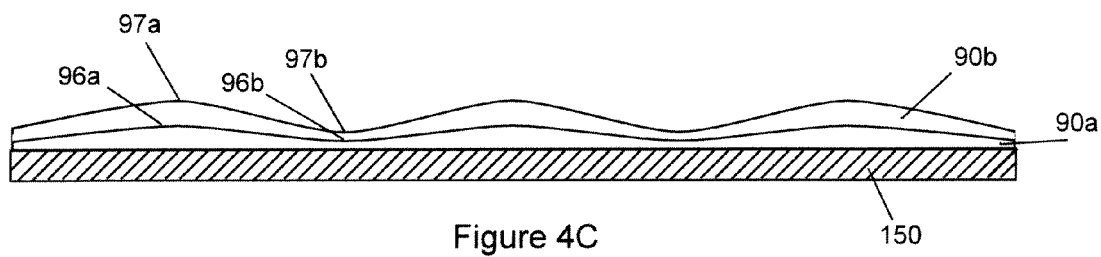

The one-sided mold for the lamination process may in fact be provided with no contouring at all, but may simply have a flat surface. Referring to FIGS. 4A, 4B, and 4C, which shows a cross-sectional view of lamination, a substantially flat mold 150 is provided. A first contoured layer 90a is provided at a first stage, as shown in FIG. 4A. The first contoured layer 90a has at least one internal area having non-uniform thickness; here, substantially all of the first contoured layer 90a has non-uniform thickness. In particular, this exemplary layer 90a has been contoured to provide at least one peak 96a and at least one trough 96b. It will be appreciated that these features 96a, 96b may not extend along the entire length of the layer 90a; that is to say, cross-sections of the layer 90a parallel to the cross-section shown in FIG. 4A taken at different points of the contoured layer 90a may not have the same profile as the exemplary cross-section shown in FIG. 4A. The first contoured layer 90a is placed on the flat mold 150, as shown, so that the contoured face 92 of the layer 90a is facing away from the mold 150.

At a subsequent stage in lamination, an adhesive is provided to laminate the first contoured layer 90a to a next contoured layer 90b, shown in FIG. 4B. In this example, the next contoured layer 90b has the same general cross-sectional profile as the first contoured layer 90a, such that it also has a corresponding peak 97a and trough 97b. The next contoured layer 90b is applied in the general direction indicated by the arrows in FIG. 4B so that the face 93 opposing the contoured face 94 of the layer 90b is the face that will contact the first contoured layer 90a. The next layer 90b may be aligned such that the portion of the face 93 corresponding to the peak 97a contacts the peak 96a of the first contoured layer 90a, and the portion of the face 93 corresponding to the trough 97b contacts the trough 96a of the first layer 90a. Additional layers (not shown) may also be superimposed on the next contoured layer 90b. The lamination is then completed, for example in the manner described above. As shown in FIG. 4C, the contoured layer 90b (and any additional layers provided on top of layer 90b) is deformable so that it contacts substantially all of the contoured face 92 of the first layer 90a. Because in this embodiment the peaks 96a, 97a and the troughs 96b, 97b are aligned, it can be seen that the thickness of the resultant laminate is increased at those points corresponding to the peaks 96a, 97a, and is correspondingly thinner at the troughs 96b, 97b, resulting in a greater disparity between the maximum and minimum thicknesses of the finished laminate. It will be appreciated that peaks in the resultant laminate in this embodiment approach a triangular profile. The laminate is then removed from the mold 150. In the embodiment shown in FIG. 4C, the resultant laminate is contoured on the upper face (which in the two-layer example of FIG. 4C is the upper face 94 of the second contoured layer 90b) and is substantially flat on the opposing, lower face that had been placed on the substantially flat mold 150. If the mold 150 were itself provided with a contoured face, as described in Hunter referenced above, then mold would impart a further contour to the entire resultant laminate, and the lower face of the resultant laminate need not be flat.

Figure 5:
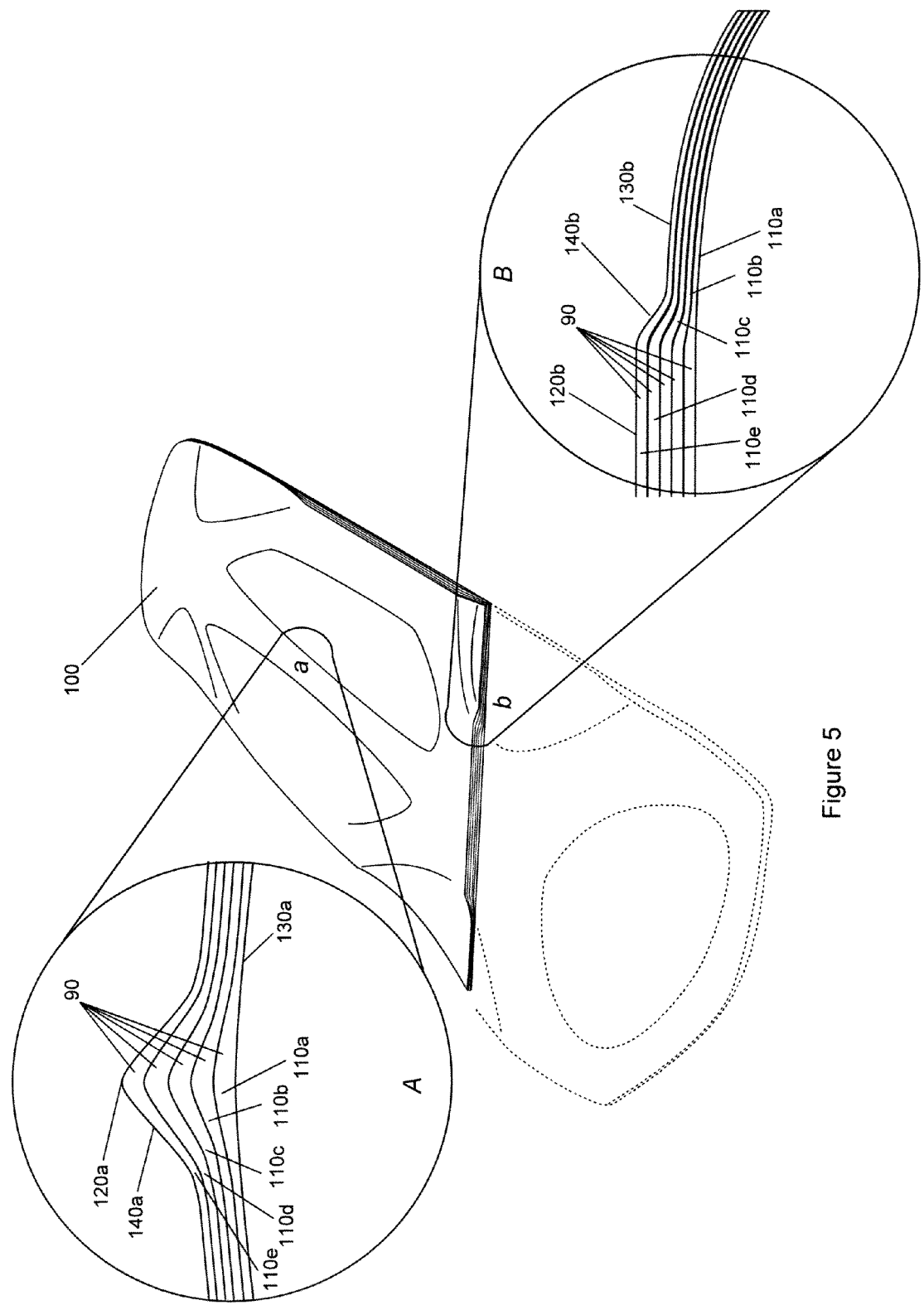
FIG. 5 is a perspective, cross-sectional view of a laminate in the shape of a skateboard deck and close-up views thereof.

The resultant laminate 100 is thus composed of at least one substantially continuous veneer layer, and may be contoured and may be of non-uniform thickness as shown in FIG. 5. Close-up views A and B show portions of the cross-section of the laminate 100 at two areas of the laminate 100, a and b, respectively. It will be appreciated that at least one substantially continuous veneer layer with non-uniform thickness extends over substantially the entire area of the laminate (although the outside edges of various layers of the laminate may be uneven, and may require cutting and/or sanding as a finishing step), and that at least one face of each contoured layer 90 in the laminate is in substantially continuous contact with an adjacent layer in the laminate 100. Contoured layers 90 provided as an inner layer of the laminate 100 thus have two opposing faces in substantially continuous contact with adjacent layers in the laminate 100. As shown in the views A and B, the laminate 100 has a side profile that is striated by layers 110a to 110e of contoured veneer 90. In this embodiment, the various layers 110a to 110e have similar thickness profiles, so where the stacked contoured veneer layers are thicker, the laminate is thicker 120a, 120b. Likewise, where the stacked contoured veneer layers are thinner, the laminate is thinner 130a, 130b. At the transition areas 140a, 140b between thicker 120a, 120b and thinner 130a, 130b areas of the laminate, the slope of the constituent contoured veneer layers varies. For example, as shown in view B, the lower surface of layer 110a is substantially flat at the transition area 140b. Layer 110b, on top of layer 110a, in addition to any change in thickness in the layer 110b itself is sloped in the transition area 140b as a result of the change in thickness of layer 110a. Layer 110c has a steeper slope at the transition area 140b than layer 110b. Similarly, layers 110d and 110e have steeper slopes at the transition area 140b than layers 110c and 110d, respectively. Further variations in the slopes of constituent layers may be accomplished at transition areas 140a, 140b where a three dimensional contour mold 150 is used for lamination.

It will be appreciated by those skilled in the art that the lamination of a plurality of contoured surfaces, such as that described with reference to FIGS. 4A, 4B, and 4C above and with reference to FIGS. 9A, 9B, and 9C below, provide enhanced strength to the finished laminate. By providing contoured surfaces such as contoured surface 92 or 94 on a layer for lamination, increased surface area is provided for receiving adhesive and for bonding to an adjacent layer, which increases the strength of the laminate. The additional thickness imparted to the laminate as a result of the contouring of the individual layers also improves the strength of the laminate; moreover, the regions of increased thickness in the laminate, particularly those regions with thickness profiles having a generally triangular shape, may provide additional resistance to bending.

It can be seen that the exemplary laminate 100 in FIG. 5 is generally in the shape of a skateboard deck. This shape may be obtained by cutting and/or sanding the resultant laminate after the lamination process (with reference to FIG. 3, the contoured veneer layers 90 are generally rectangular). The veneer, either prior to or after contouring, may be cut to the approximate finished size prior to lamination, to minimize the amount of shaping and finishing required after lamination.

Figure 9A:
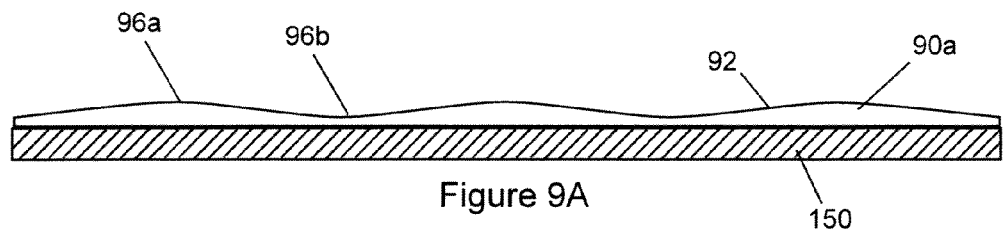
FIGS. 9A, 9B, and 9C are further cross-sectional views of exemplary contoured veneers undergoing lamination.
Figure 9B:
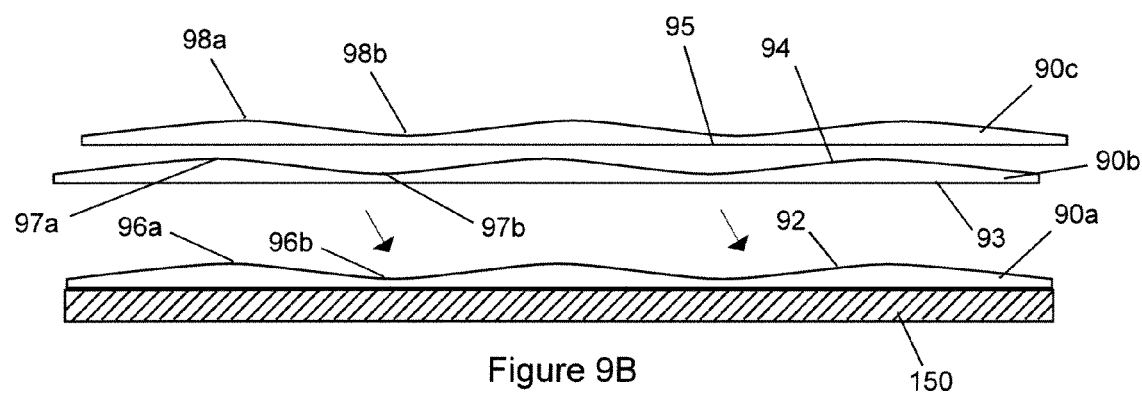
Figure 9C:
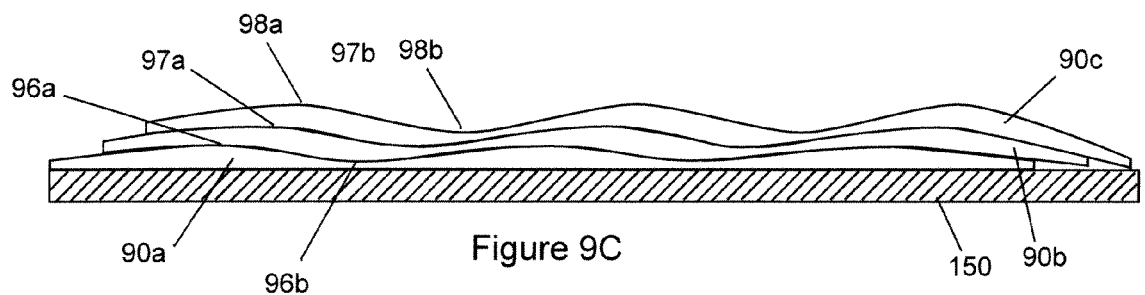

Similarly, FIG. 9A shows the substantially flat mold 150 and a first contoured layer 90a. Again, the first contoured layer 90a is provided with at least one internal area of non-uniform thickness; in this example, there is provided at least one peak 96a and at least one trough 96b. Again, it will be appreciated that these features 96a, 96b may not extend along the entire length of the layer 90a. The first contoured layer 90a is placed on the flat mold 150, as shown, so that the contoured face 92 of the layer 90a is facing away from the mold 150. At a subsequent stage, an adhesive is provided to laminate the first contoured layer 90a to a next contoured layer 90b, shown in FIG. 9B. Again in this example, the next contoured layer 90b has the same general cross-sectional profile as the first contoured layer 90a, such that it also has a corresponding peak 97a and trough 97b. The next contoured layer 90b is applied as shown in FIG. 9B so that the face 93 opposing the contoured face 94 of the layer 90b is the face that will contact the first contoured layer 90a. In this example, while the second contoured layer 90b has a cross-sectional profile that is similar to the cross-sectional profile of the first contoured layer 90a, the second layer 90b is placed on the first layer 90a such that its profile is offset from that of 90a. Thus, the portion of the face 93 corresponding to the peak and trough 97a, 97b of the second layer 90b is offset from the portion of the contoured surface 92 of the first layer 90a comprising the peak and trough 96a, 96b. Similarly, an additional layer 90c, again having a similar cross-sectional profile to the first layer 90a, may also be provided in a similar manner; it may be arranged on the second layer 90b such that the features of the third layer 90c's contoured surface, such as peak 98a and trough 98b, are offset from the positions of the peak and trough 97a, 97b of the second layer 90c. The face 95 of the third contoured layer 90c opposing the contoured face of layer 90c is substantially in complete contact with all of the contoured face 94 of the second contoured layer 90b, and the face 93 of the second layer 90b is in substantially complete contact with the contoured face 92 of the first layer 90a, although some portions of the faces 92, 93, 94 may be exposed by some amount at the edges of the laminate, as can be seen in FIG. 9C, as a result of the offset of each layer 90b, 90c from the position of the underlying layer 90a, 90b respectively. It will be appreciated, however, that at least one surface of each of the layers 90a, 90b, and 90c is in substantially continuous contact with a surface of another of the layers. The result, as shown in FIG. 9C, is a laminate of substantially non-uniform thickness, having one contoured surface and one substantially flat surface (the surface that was in contact with the mold 150). Again, it will be appreciated that if the mold 150 itself were provided with a contoured face, then all layers of the laminate may be provided with additional curvature.

The veneer sheets 10 or contoured veneer layers 90 may be cut to the desired shape, either prior to contouring as described above, or prior to lamination. Holes, slits or other openings to be provided in the finished laminate may be cut in each contoured layer 90, and aligned during the lamination process to form an aperture in the resulting laminate. Alternatively or additionally, the resultant laminate 100 may be cut, shaped or otherwise finished. Veneers of different wood types or colours, or even layers of non-wood materials may be used to create a side profile with multi-coloured, multi-textured striations of varying thickness and curves. It will be appreciated that not every layer in the laminate need comprise a contoured layer of non-uniform thickness extending across the entire area of the laminate; for example, some layers may comprise veneer of uniform thickness; in some embodiments, the resultant laminate may also comprise a core (not shown) in addition to one or more contoured layers of non-uniform thickness. The core may be a solid structure that does not extend across the entire area of the laminated object, but provides additional strength to the laminate structure. The core is added during the lamination process, between two adjacent contoured layers 90. The laminate may also combine materials in different layers, such as hardwood veneer, bamboo, and carbon fiber. One or more of these layers of different material may be contoured. It will be appreciated that where layers of other materials, such as carbon fiber, are added as laminate layers, these layers will follow the contours defined by the surrounding contoured layers, which may add to the overall strength of the layer, improving its resistance to bending or flexing. One or more layers of veneer within the laminate may be arranged in a different grain direction than adjacent layers; for example, to increase strength, the grain of a veneer layer may be aligned at a substantially right angle to the grain of the adjacent veneer layer. To provide aesthetic interest, layers of contoured veneer may be aligned at right angles or different angles to the adjacent layers within a laminate; for example, the grain of veneer layers may alternate between two orientations. Such arrangements may also increase the strength of the finished laminate.

Figure 6A:
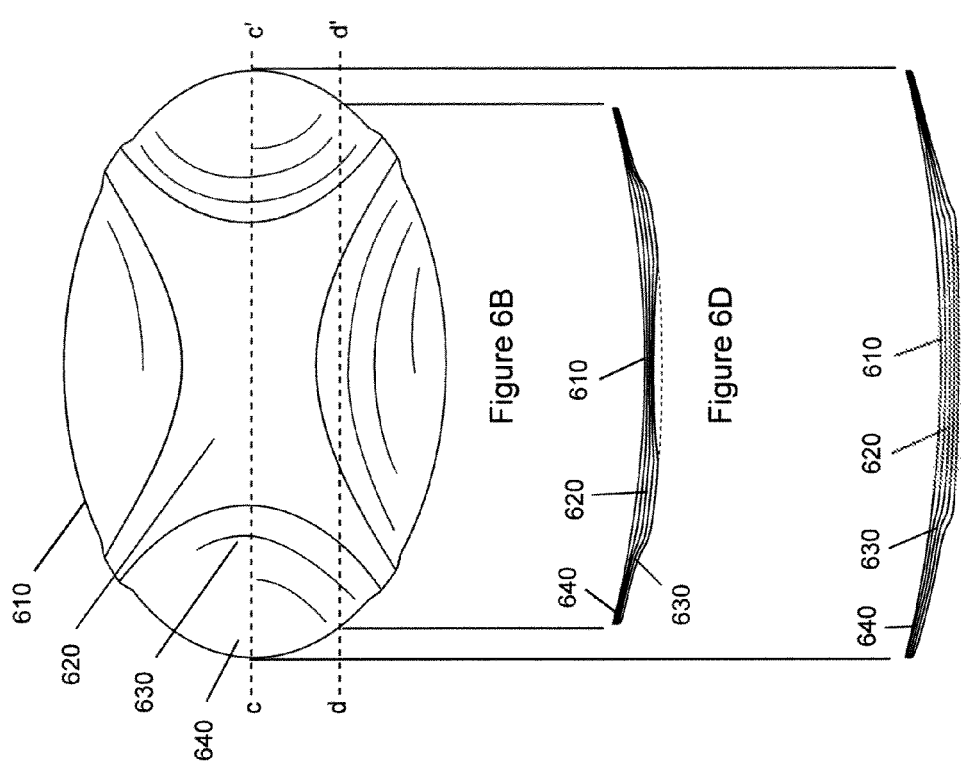
FIG. 6A is a perspective view of a chair having a laminate back.
Figure 6A:
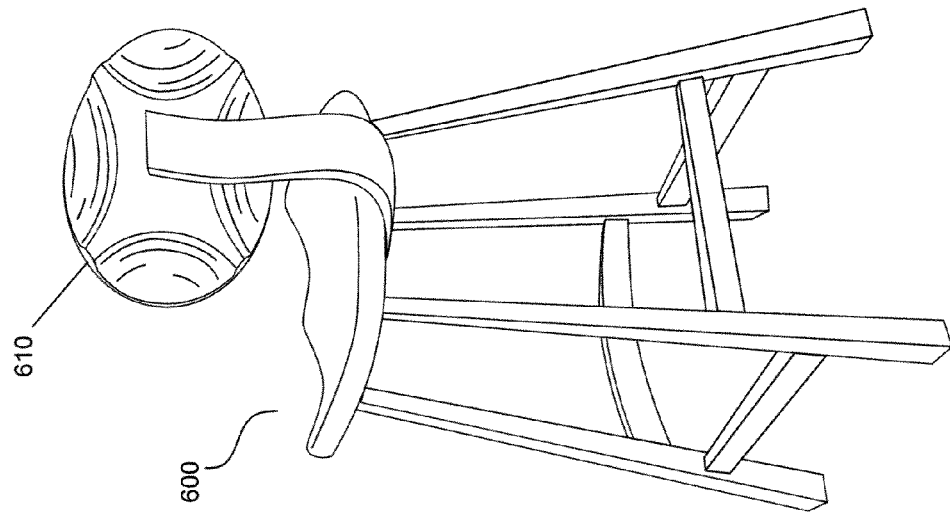

The relief pattern created on the contoured layers 90, the shape of the contoured lamination mold on which the contoured layers 90 are stacked and the overall shape of the laminate may be varied to create other objects such as contoured stool seats, and other furniture, finishing and building materials such as plywood for use in furniture manufacture, doors, and cabinetry. For example, FIG. 6A illustrates a completed chair 600 with a chair back 610 made of a finished laminate 100, also shown in FIG. 6B. The chair back 610 comprises a laminate of non-uniform thickness, in which a first area of the chair back 640 is thinner than area 620, and the interface between these two areas or regions, 630, is a region in which the chair back 610 transitions from thin to thick. FIG. 6C illustrates a cross-sectional view of the chair back 610 of FIG. 6B at the line c-c'. It can be seen, for example, that the chair back 610 is formed of contoured layers resulting in enlarged areas such as area 620, without the need to insert spacing elements or wedges between adjacent laminate layers. The chair back 610 is enlarged across the midsection of the back along c-c'. The chair back 610 has a thinner cross-section in area 640, similarly without the need to remove wedges or layers of veneer, and the cross-sectional thickness increases in the transitional region 630. It can be seen that the cross-sectional profile of the chair back 610 varies with the height of the chair back 610, referring to FIG. 6D. FIG. 6D illustrates a cross-sectional view of the chair back 610 at the line d-d'. While the enlarged area 620 extends across the midsection of the chair back 610 along line c-c', it can be seen that at line d-d' the area 620 no longer extends across the center of the chair back 610. In other words, the chair back 610 is of non-uniform thickness both in the direction of imaginary line d-d' and in the direction perpendicular to d-d'.

Figure 10A:
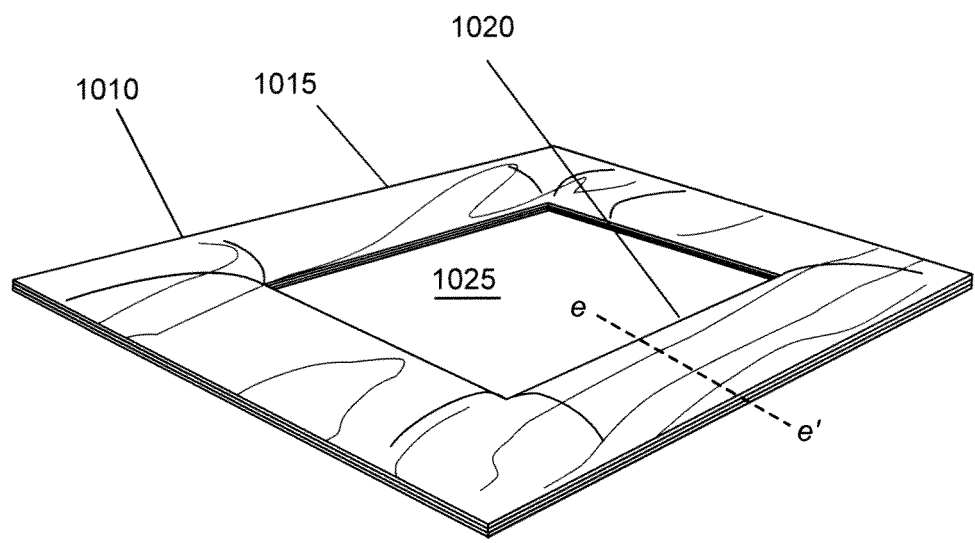
FIGS. 10A and 10B are a perspective view and cross-sectional view, respectively, of a laminate in the shape of a frame.
Figure 10B:
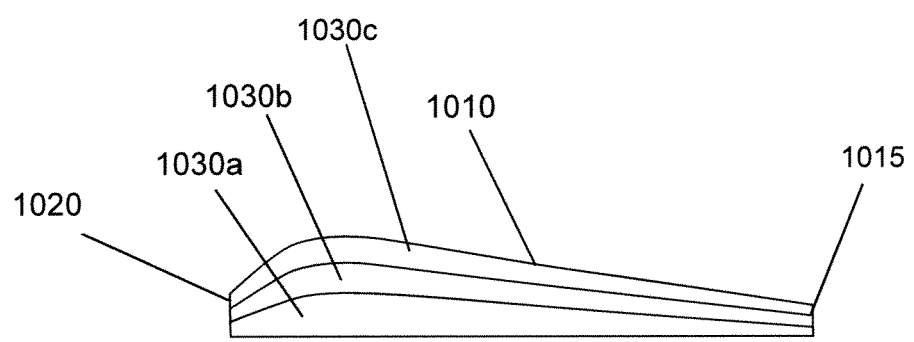

In a further embodiment, as shown in FIGS. 10A and 10B, the laminate may be provided in another utilitarian or decorative shape with one or more void areas, such as a picture frame 1010. The picture frame 1010 comprises, like the other laminate examples described herein, at least one substantially continuous layer having a non-uniform thickness. The frame 1010 may be formed of laminate in different ways. In the first method, a plurality of layers, such as veneer layers, may be provided to substantially correspond to the overall finished shape of the frame 1010, which in this example has both an external perimeter 1015 and an internal perimeter 1020; the internal perimeter 1020 defines a void area 1025 where there is no veneer or other material. These layers may be cut from veneer blanks either before or after contouring, which may be carried out as described above; or, smaller, solid veneer blanks having approximately the same external perimeter 1015 as the intended frame 1010 may be contoured first, then the void area 1025 defined by cutting each of the smaller blanks at approximately the internal perimeter 1020. Alternatively, the void area 1025 may be defined during the contouring process, for example by sanding away the entire thickness of the layer during contouring, so as to provide the frame shape after the contouring step but before lamination. The layers are laminated together to provide the frame 1010, and there is no need to cut out the internal region of the laminate to provide the frame shape. Thus, the layers of non-uniform thickness extend over the entire frame shape, which is the entire area of the laminate. In a second method, the internal perimeter 1020 is not cut out of each of the layers before lamination; the void area 1025 may then be cut out after lamination is completed.

A cross-sectional profile of the frame 1010 at the line e-e' indicated in FIG. 10A is shown in FIG. 10B. It can be seen that the frame 1010 has a non-uniform thickness and comprises a plurality of non-uniformly thick layers 1030a-c (three layers are shown for illustrative purposes; it will be appreciated that the frame 1010 may comprise a different number of layers).

Figure 7:
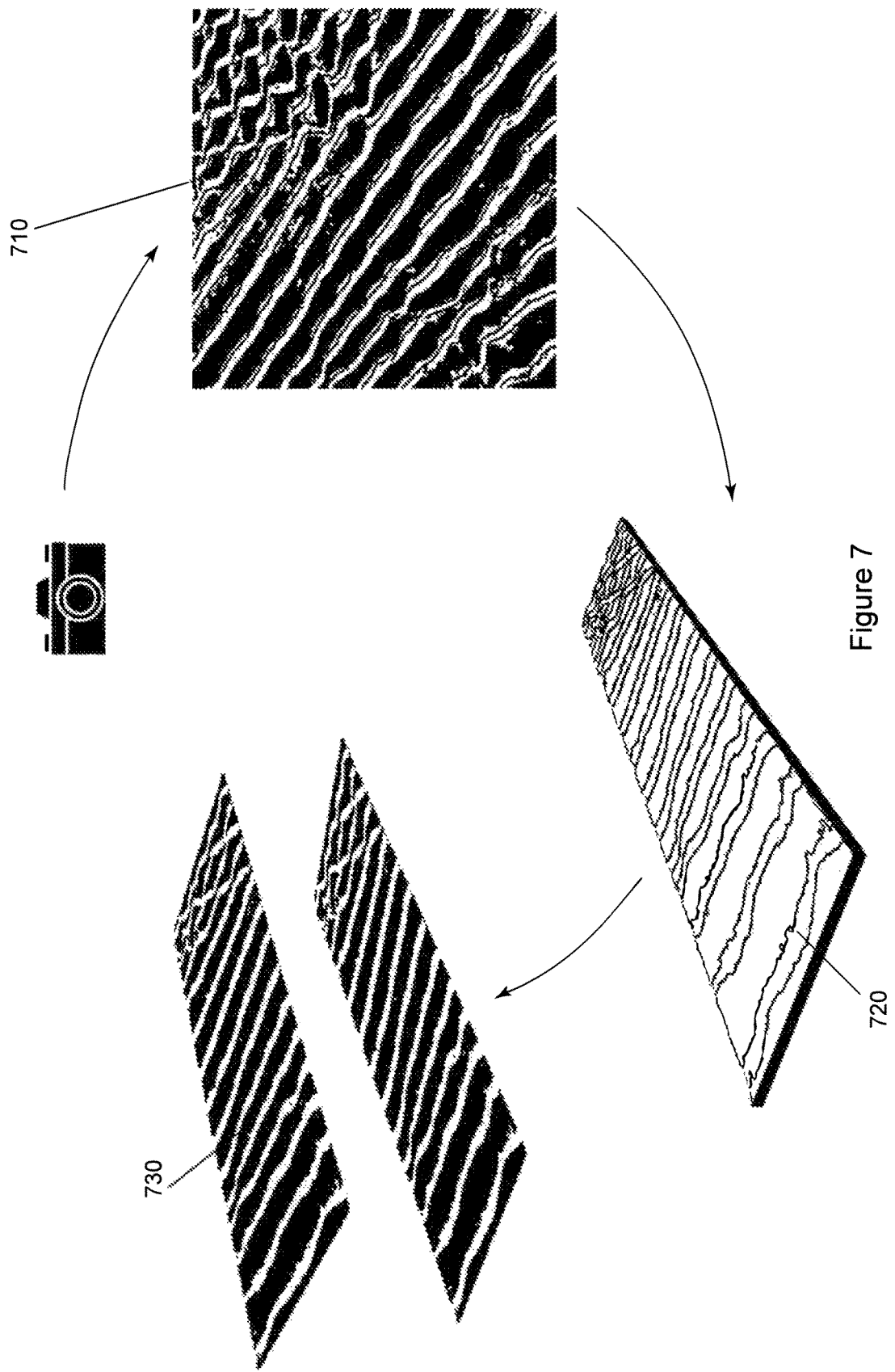
FIG. 7 is schematic illustration of a process for providing a contoured mold for shaping contoured layers.

The contours of the mold 20 may comprise regular textural patterns, such as a periodic, three-dimensional wave pattern, or irregular contours with or without repeating elements. For complex relief pattern designs, a digital image of the pattern may be used as input to a computer-controlled milling machine that mills a contoured surface onto the base 70 of the sanding mold 20. For example, referring to FIG. 7, a digital image 710 representing a textured or patterned surface, for example sand dune ripples, may be scaled and/or cropped to fit the approximate size of a sanding mold 20, and the various values of the digital image 710 (for example, greyscale or hue, saturation, or intensity values) correlated to heights or depths of the sanding mold to be used to program a milling machine to mill a substrate to produce a sanding mold 720 with a relief pattern corresponding to the processed digital image. It will be appreciated that the original digital image need not be a presentation of a texture pattern in nature, but may also include graphic designs with variations in colour, provided colour values in the design are correlated to heights or depths for milling the substrate. The sanding mold 720 may then be used as described above to provide one or more contoured layers 730.

The above process may be used to provide strengthened plywood with a side profile comprising non-parallel edges of the component layers. As can be seen from FIGS. 4A, 4B, and 4C, the plywood may have a textured surface resulting from the additive effects of the contours of the component layers.

Figure 8:
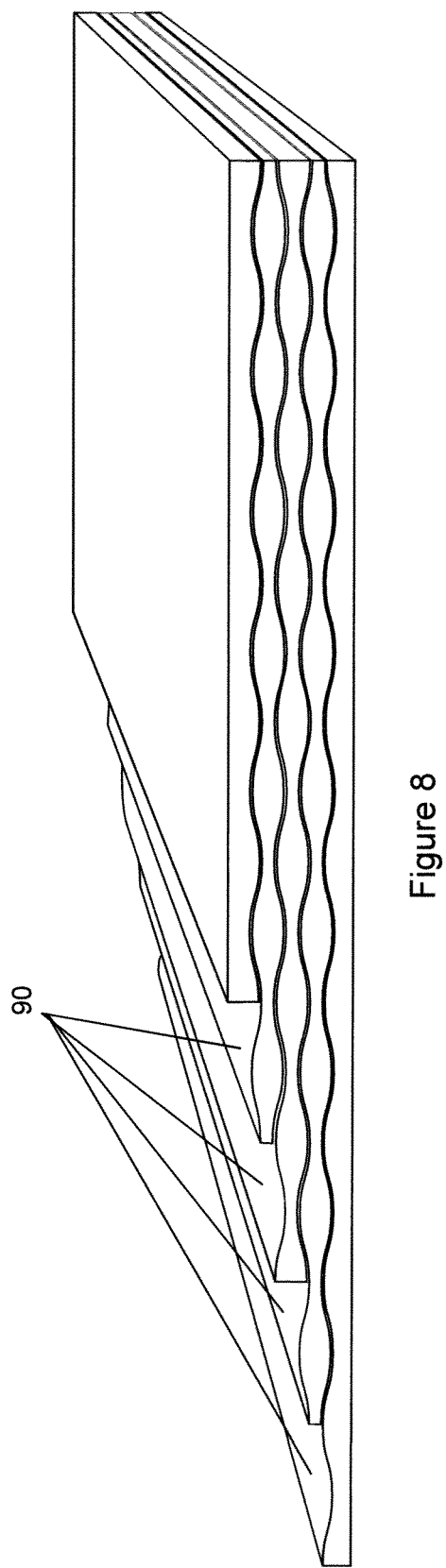
FIG. 8 is a perspective view of an embodiment of strengthened plywood.

While the upper, textured surface of the plywood may then be sanded to flatten the upper surface, this has the potential effect of weakening the overall plywood structure. As an alternative, the plywood may be manufactured by displacing adjacent contoured layers 90 so that peaks in a first layer correspond to troughs in another layer, as shown in FIG. 8. In a further embodiment, complementary molds (not shown) for making contoured layers may be provided for shaping the alternate layers 90 of the laminate so that displacement is not required.

A laminate formed using one or more contoured veneer layers 90 may thus be produced, with either a substantially uniform overall thickness or with a non-uniform overall thickness. If the laminate does not have a substantially uniform thickness, a uniform thickness may be obtained after lamination by sanding one or both of the exterior faces of the laminate.

Where wood veneer is used, the veneer sheet 10 is of a thickness such that it is capable of being pressed or held to the contours of the sanding mold 20. It will be appreciated by those skilled in the art that the initial thickness of the veneer 10, and the final thicknesses of the contoured veneer 90, may be selected according to the flexibility of the material and its ability to be formed into a laminate of the desired shape. For example, the veneer 10 to be contoured may be provided in an initial thickness that is at least ¼ inch (approximately 0.635 cm), which allows for a range of contour depths in the contoured veneer 90 (for example, up to about 3/16 inch may be sanded or otherwise removed from the surface of the veneer 10, leaving approximately 1/16 inch base thickness for the contoured veneer 90; depending on the material selected for the veneer 10, this base thickness may be thinner or thicker). While thinner veneers 10 may be provided for example in the range of about 1/16 inch to ⅛ inch, less variation in thickness of the contoured veneer 90 will result. If the contoured veneer 90 is shaped using the thickness sander method described above, the initial veneer 10 should still be sufficiently flexible such that it follows the contours of the mold 20 when the veneer 10 and mold 20 are passed through the thickness sander.

Contoured veneer 90 for use in laminates may be manufactured directly from a wood log or blank. Veneer or plywood layers are generally manufactured by either slicing wood horizontally or vertically using a blade or saw, or by roll cutting, in which a debarked log is turned on a lathe while a blade is positioned along the width of the log face, thus peeling the log to form veneer. The process of manufacturing veneer from wood logs or blanks will be known to those of ordinary skill in the art. In a further embodiment, contoured veneer 90 is formed using the roll cutting technique. However, unlike the prior art technique in which the angle of the blade against the log is maintained such that the thickness of the veneer layer cut from the blade is substantially constant, the angle of the blade is varied as the log is rotated so that a contoured veneer 90 is produced. The angle of the blade may be controlled either manually or automatically by computer control as the contoured veneer 90 is cut.

In still a further embodiment, the technique of cutting veneer horizontally or vertically from a blank or log is used. However, unlike the prior art technique, the blade is displaced as it cuts through the wood blank or log. If the cuts are made in a generally vertical direction, then the blade is displaced horizontally; if the cuts are made in a horizontal direction, then the blade is displaced vertically. The blade may be displaced over a range of approximately ⅛ inch as the cuts are made.

In the above two cutting embodiments, it will be appreciated that the thickness of the contoured veneer 90 will only vary substantially in one dimension (in the direction of the cut), and will not vary substantially along the other dimension of the veneer.

If the contoured veneer 90 is produced using this alternate method, it may be provided with a single contoured face, or with two contoured faces. For example, if the veneer is cut in slices from logs or blanks, every alternate cut may be made with the blade held at the same pitch so that the surface is substantially even, whereas other slices are made with the pitch of the blade varying as the veneer is sliced. If the veneer is roll-cut from a rotating log, the pitch of the blade against the log may be varied over a first rotation of the log, but kept at a substantially constant pitch with respect to the surface of the log over a subsequent rotation. It will be appreciated that in the roll-cutting embodiment in this case, the veneer cut while the blade is at a substantially constant pitch may have a consistent cross-sectional thickness, but may not lie flat unless pressed or weighted.

Various embodiments of the present invention having been thus described in detail by way of example, it will be apparent to those skilled in the art that variations and modifications may be made without departing from the invention.

What is claimed is:

1. A laminate assembled from:
a plurality of layers, each layer being substantially continuous and extending over an entire area of the laminate, each layer of the plurality of layers comprising a thickness profile, the thickness profile comprising at least one interior area of non-uniform thickness;
at least one layer of the plurality of layers being in substantially continuous contact with two adjacent layers of the plurality of layers;
the thickness profiles of each of at least two layers of the plurality of layers being substantially similar;
the at least one interior area of non-uniform thickness of at least two layers of the plurality of layers corresponding to provide an additive effect in the laminate such that a surface of the laminate is contoured;
each layer of the plurality of layers comprising wood.

2. The laminate of claim 1, wherein an entirety of each layer of the plurality of layers has a non-uniform thickness.

3. The laminate of claim 1, wherein the thickness profiles of each layer of the plurality layers are substantially similar.

4. The laminate of claim 1, wherein the thickness profiles of all layers of the plurality layers are the same.

5. The laminate of claim 1, wherein each layer of the plurality of layers comprises a veneer.

6. The laminate of claim 1, wherein each layer of the plurality of layers comprises at least one of a distinct colour or a distinct grain.

7. The laminate of claim 1, wherein at least one layer of the plurality of layers comprises an irregular thickness profile.

8. The laminate of claim 1, wherein the at least one interior area of non-uniform thickness of each layer of the plurality layers comprises one or more peaks, and further wherein at least one of the one or more peaks of a first one of the layers is substantially aligned with a corresponding one of the one or more peaks of a second one of the layers.

9. The laminate of claim 1, wherein an opposing surface of the laminate is substantially flat.

10. The laminate of claim 5, wherein each layer of the plurality of layers comprises a grain, and further wherein the grain of each said layer is aligned substantially perpendicularly from the grain of an adjacent layer.

11. The laminate of claim 1, wherein, prior to lamination in the laminate, a first surface of each layer of the plurality of layers is substantially flat, and an opposing surface of each said layer is contoured relative to the corresponding first surface.

12. The laminate of claim 1, wherein each layer of the plurality of layers comprises a veneer having a thickness not exceeding about ¼ inch.

13. The laminate of claim 1, wherein each layer of the plurality of layers comprises a veneer having a thickness not exceeding about ⅛ inch.

14. The laminate of claim 8, wherein all of the peaks of the first one of the layers are substantially aligned with corresponding ones of the peaks of the second one of the layers.

15. The laminate of claim 1, wherein the at least one interior area of each of the plurality layers does not comprise any sharp angles.

16. The laminate of claim 1, wherein the laminate is in the shape of a furniture component.

17. The laminate of claim 1, wherein the laminate is in the shape of a skateboard deck.

* * * * *